United States Patent
Lin et al.

(10) Patent No.: US 11,343,821 B2
(45) Date of Patent: May 24, 2022

(54) METHOD AND APPARATUS FOR PERFORMING RESOURCE SCHEDULING AND DELIVERING CONTROL INFORMATION IN VEHICLE-TO-EVERYTHING COMMUNICATION SYSTEM

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN); Qianxi Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/164,249

(22) Filed: Feb. 1, 2021

(65) Prior Publication Data

US 2021/0160872 A1     May 27, 2021

Related U.S. Application Data

(63) Continuation of application No. PCT/CN2018/099228, filed on Aug. 7, 2018.

(51) Int. Cl.
*H04W 72/04*     (2009.01)
*H04W 4/40*     (2018.01)

(52) U.S. Cl.
CPC ......... *H04W 72/0453* (2013.01); *H04W 4/40* (2018.02); *H04W 72/042* (2013.01)

(58) Field of Classification Search
CPC ... H04W 72/0453; H04L 5/0094; H04L 5/001
See application file for complete search history.

(56) References Cited

FOREIGN PATENT DOCUMENTS

| CN | 106954272 A | 7/2017 | |
|---|---|---|---|
| WO | WO-2020008539 A1 * | 1/2020 | ........ H04W 72/0406 |
| WO | WO-2020008644 A1 * | 1/2020 | ........... H04L 5/0098 |

OTHER PUBLICATIONS

Extended European Search Report for EP Application 18929549.6 dated Jun. 11, 2021. (10 pages).

(Continued)

*Primary Examiner* — Kevin Kim
(74) *Attorney, Agent, or Firm* — Young Basile Hanlon & MacFarlane, P.C.

(57) ABSTRACT

A method and an apparatus for performing resource scheduling and delivering control information in a vehicle-to-everything (V2X) communication system are provided. The method for performing, by a base station (BS), the resource scheduling and delivering control information in the V2X communication system includes transmitting, to at least one user equipment (UE), a downlink control information (DCI) format associated with a cellular vehicle-to-everything (C-V2X) carrier, wherein the C-V2X carrier includes a plurality of bandwidth parts (BWPs), incorporating a BWP indicator in the DCI format, allocating at least one of the BWPs for a long term evolution V2X (LTE-V2X) operation according to the BWP indicator in the DCI format, and allocating a remaining of the BWPs for a new radio V2X (NR-V2X) operation according to the BWP indicator in the DCI format.

20 Claims, 5 Drawing Sheets

(56) References Cited

OTHER PUBLICATIONS

Samsung, Discussion on SPS support with multiple sidelink carriers, 3GPP TSG-RAN WG2 Meeting #102, R2-1808671 (Revision of R2-1806108), May 21-25, 2018. (2 pages).
Huawei, HiSilicon, Summary of remaining issues on bandwidth part and wideband operation, 3GPP TSG RAN WGI Meeting #92, RI-1801347, Feb. 26-Mar. 2, 2018. (13 pages).
Samsung, Wider Bandwidth Operations, 3GPP TSG RAN WG1 NR Ad-Hoc#2, R1-1710761, Jun. 27-30, 2017. (8 pages).
Guangdong OPPO Mobile Telecom, Bandwidth part configuration and frequency resource allocation, 3GPP TSG RAN WG1 NR Ad-Hoc#2, R1-1710164, Jun. 27-30, 2017. (6 pages).
Ericsson, Contents of Downlink Control Information for V2V over PCS, 3GPP TSG RAN WG1 Meeting #86, R1-166957, Aug. 22-26, 2016. (3 pages).
ZTE's view on Rel16 Sis and Wis; ZTE Corporation; Jun. 1, 2018; RP-180786.
3 GPP TSG RAN #77; Sapporo, Japan; Sep. 11-14, 2017; RP171517.
3GPP TSG RAN Meeting #80; La Jolla, CA, USA, Jun. 11-14, 2018; RP-180993.
International Search Report for PCT/CN2018/099228 dated Apr. 29, 2019.
Communication pursuant to Article 94(3) EPC for EP Application 18929549.6 dated Jan. 4, 2022. (9 pages).

\* cited by examiner

METHOD AND APPARATUS FOR PERFORMING RESOURCE SCHEDULING AND DELIVERING CONTROL INFORMATION IN VEHICLE-TO-EVERYTHING COMMUNICATION SYSTEM

CROSS-REFERENCE TO RELATED APPLICATION(S)

The present application is a continuation application of International PCT Application No. PCT/CN2018/099228, filed on Aug. 7, 2018, the entire content of which is hereby incorporated by reference.

TECHNICAL FIELD

The present disclosure relates to the field of communication systems, and more particularly, to a method and an apparatus for performing resource scheduling and delivering control information in a vehicle-to-everything (V2X) communication system.

BACKGROUND

In an evolution and advancement of intelligent transportation system (ITS), so far there have been two main radio access technologies (RATs), namely 802.11p developed by an institute of electrical and electronics engineers (IEEE) and a long term evolution vehicle-to-everything (LTE-V2X) developed by 3rd generation partnership project (3GPP). At the time when the LTE-V2X technology is developed, the only spectrum frequency band assumed to be available and allocated for ITS usage is in 5.9 GHz. Within this band, the bandwidth is limited to 60 MHz to 80 MHz, depending on region or country. If LTE-V2X is deployed in this band, a total bandwidth may be divided into several individual frequency channels and each channel is to be operated independently from others (e.g. 6 individual channels each having 10 MHz bandwidth or 4 channels each having 20 MHz bandwidth). That is, when a user equipment (UE) is operating LTE-V2X on one of the channels, the UE treats the channel as a frequency carrier for transmitting and receiving V2X messages. In a recently developed 5th generation new radio (5G-NR) cellular system by 3GPP, a new concept of bandwidth parts (BWPs) is introduced, where a carrier or a cell can have a very large bandwidth, be configured by the network and divided into several smaller parts of bandwidth. For example, a carrier or a cell having 80 MHz bandwidth can be configured and divided into 4 BWPs, each having 20 MHz bandwidth. The reasons for having smaller bandwidth parts per cell or carrier are that each BWP can be allocated with different subcarrier spacing/numerology for use by different services, switching between BWPs within a cell or carrier can be done very dynamically without having to semi-statically configured or performing a handover procedure which can take up a long time, and it is easier and faster to fall back to the initial/default BWP when others are in a bad radio condition.

Besides the BWP difference, in most of LTE technologies including LTE-V2X, it assumes every UE has a certain processing capability limitation and uniformly applies 4 ms/4 subframes of time duration for UEs to respond or prepare data for a next transmission after receiving an instruction from the base station (BS) or given a resource grant. That is, in LTE-V2X system, the BS may not allocate any resources to a UE and expect the UE to be able to transmit V2X message before subframe n+4, when the sidelink resource grant is provided in subframe n. However, for the next cellular-V2X (C-V2X) technology to be supported by a new 5G-NR system, namely NR-V2X, more advanced V2X use cases with much more stringent latency requirements, such as 3 ms and 10 ms, are already expected. Therefore, current assumption of UE processing capability limitation of 4 ms in the LTE-V2X is not able to support the new advanced use cases. Additionally, if this processing capability assumption can be improved/reduced in NR capable V2X UEs, more LTE-sidelink resources become available for network to select.

SUMMARY

An object of the present disclosure is to propose a method and an apparatus for performing resource scheduling and delivering control information in a vehicle-to-everything (V2X) communication system for providing faster and more flexible method of scheduling sidelink resources for long term evolution V2X (LTE-V2X) and new radio V2X (NR-V2X) communications.

In a first aspect of the present disclosure, a base station (BS) includes a memory, a transceiver, and a processor coupled to the memory and the transceiver. The transceiver is configured to transmit, to at least one user equipment (UE), a downlink control information (DCI) format associated with a cellular vehicle-to-everything (C-V2X) carrier. The C-V2X carrier includes a plurality of bandwidth parts (BWPs). The processor is configured to incorporate a BWP indicator in the DCI format, allocate at least one of the BWPs for a long term evolution V2X (LTE-V2X) operation according to the BWP indicator in the DCI format, and allocate a remaining of the BWPs for a new radio V2X (NR-V2X) operation according to the BWP indicator in the DCI format.

In a second aspect of the present disclosure, a method for performing, a base station (BS), resource scheduling and delivering control information in a vehicle-to-everything (V2X) communication system includes transmitting, to at least one user equipment (UE), a downlink control information (DCI) format associated with a cellular vehicle-to-everything (C-V2X) carrier, wherein the C-V2X carrier includes a plurality of bandwidth parts (BWPs), incorporating a BWP indicator in the DCI format, allocating at least one of the BWPs for a long term evolution V2X (LTE-V2X) operation according to the BWP indicator in the DCI format, and allocating a remaining of the BWPs for a new radio V2X (NR-V2X) operation according to the BWP indicator in the DCI format.

In a third aspect of the present disclosure, a user equipment (UE) includes a memory, a transceiver, and a processor coupled to the memory and the transceiver. The transceiver is configured to receive, from a base station (BS), a downlink control information (DCI) format associated with a cellular vehicle-to-everything (C-V2X) carrier. The C-V2X carrier includes a plurality of bandwidth parts (BWPs), and the DCI format includes a BWP indicator. The processor is configured to perform a long term evolution V2X (LTE-V2X) operation in at least one of the BWPs according to the BWP indicator in the DCI format and perform a new radio V2X (NR-V2X) operation in a remaining of the BWPs according to the BWP indicator in the DCI format.

In a fourth aspect of the present disclosure, a method for performing, a user equipment (UE), resource determining and interpreting control information in a vehicle-to-everything (V2X) communication system includes receiving, from a base station (BS), a downlink control information (DCI) format associated with a cellular vehicle-to-everything (C-V2X) carrier, wherein the C-V2X carrier includes a plurality of bandwidth parts (BWPs), and the DCI format includes a BWP indicator, performing a long term evolution V2X (LTE-V2X) operation in at least one of the BWPs according to the BWP indicator in the DCI format, and performing a new radio V2X (NR-V2X) operation in a remaining of the BWPs according to the BWP indicator in the DCI format.

In the implementation of the present disclosure, the method and the BS for performing resource scheduling and delivering control information in the V2X communication system include allocating the at least one of the BWPs for the LTE-V2X operation according to the BWP indicator in the DCI format and allocating the remaining of the BWPs for the NR-V2X operation according to the BWP indicator in the DCI format. The method and the UE for performing resource determining and interpreting control information in the V2X communication system include performing the LTE-V2X operation in the at least one of the BWPs according to the BWP indicator in the DCI format and performing the NR-V2X operation in the remaining of the BWPs according to the BWP indicator in the DCI format. Therefore, the implementations provide faster and more flexible method of scheduling sidelink resources for LTE-V2X and NR-V2X communications.

BRIEF DESCRIPTION OF DRAWINGS

In order to more clearly illustrate the implementations of the present disclosure or related art, the following figures will be described in the implementations are briefly introduced. It is obvious that the drawings are merely some implementations of the present disclosure, a person having ordinary skill in this field can obtain other figures according to these figures without paying the premise.

DETAILED DESCRIPTION

Implementations of the present disclosure are described in detail with the technical matters, structural features, achieved objects, and effects with reference to the accompanying drawings as follows. Specifically, the terminologies in the implementations of the present disclosure are merely for describing the purpose of the certain implementation, but not to limit the disclosure.

Figure 1:
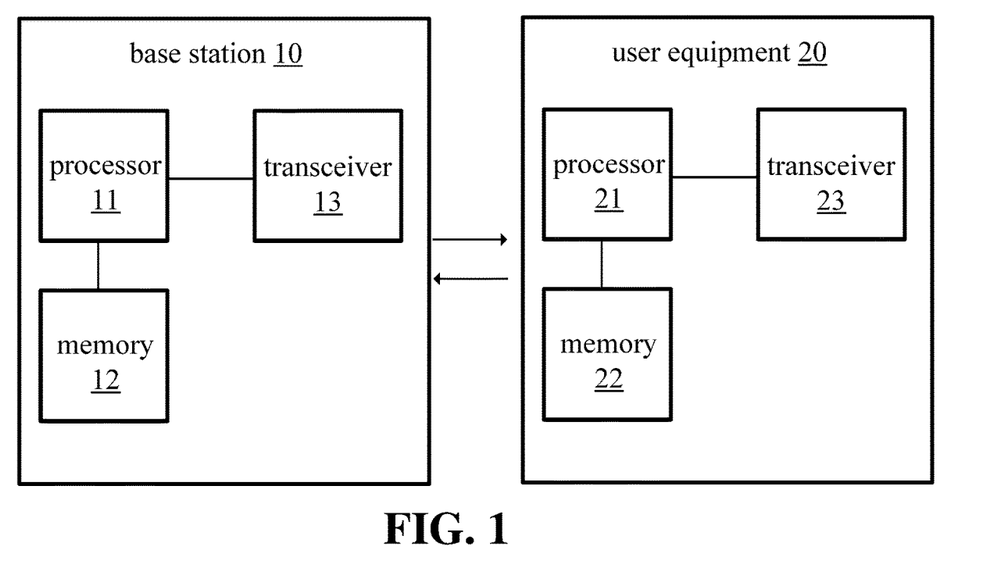
FIG. 1 is a block diagram of a base station (BS) and a user equipment (UE) for performing resource scheduling and delivering control information in a vehicle-to-everything (V2X) communication system according to an implementation of the present disclosure.

FIG. 1 illustrates that, in some implementations, a base station (BS) 10 and a user equipment (UE) 20 for performing resource scheduling and delivering control information in a vehicle-to-everything (V2X) communication system according to an implementation of the present disclosure. The BS 10 may include a processor 11, a memory 12 and a transceiver 13. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

The UE 20 may include a processor 21, a memory 22 and a transceiver 23. The processor 21 may be configured to implement proposed functions, procedures and/or methods described in this description. Layers of the radio interface protocol may be implemented in the processor 21. The memory 22 is operatively coupled with the processor 21 and stores a variety of information to operate the processor 21. The transceiver 23 is operatively coupled with the processor 21, and transmits and/or receives a radio signal.

The processors 11 and 21 may include application-specific integrated circuit (ASIC), other chipset, logic circuit and/or data processing device. The memories 12 and 22 may include read-only memory (ROM), random access memory (RAM), flash memory, memory card, storage medium and/or other storage device. The transceivers 13 and 23 may include baseband circuitry to process radio frequency signals. When the implementations are implemented in software, the techniques described herein can be implemented with modules (e.g., procedures, functions, and so on) that perform the functions described herein. The modules can be stored in the memories 12 and 22 and executed by the processors 11 and 21. The memories 12 and 22 can be implemented within the processors 11 and 21 or external to the processors 11 and 21 in which case those can be communicatively coupled to the processors 11 and 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) 5th generation NR (5G-NR) radio access technology. UEs are communicated with each other directly via a sidelink interface such as a PC5 interface.

In some implementations, the transceiver 13 is configured to transmit, to at least one user equipment (UE) such as the UE 20, a downlink control information (DCI) format associated with a cellular vehicle-to-everything (C-V2X) carrier. The C-V2X carrier includes a plurality of bandwidth parts (BWPs). The processor 11 is configured to incorporate a BWP indicator in the DCI format, allocate at least one of the BWPs for a long term evolution V2X (LTE-V2X) operation according to the BWP indicator in the DCI format, and allocate a remaining of the BWPs for a new radio V2X (NR-V2X) operation according to the BWP indicator in the DCI format.

Further, in some implementations, the processor 11 is configured to assign at least one LTE-sidelink channel for the LTE-V2X operation, and the at least one BWP for the LTE-V2X operation overlaps with the at least one LTE-sidelink channel. The processor 11 is configured to schedule a plurality of sidelink resources for the at least one UE 20 using the DCI format. The processor 11 is configured to incorporate a transmission start timing indicator in the DCI format. The processor 11 is configured to indicate a start timing for the at least one UE to transmit a plurality of V2X messages using the transmission start timing indicator. The processor 11 is configured to schedule at least one of a plurality of LTE-sidelink resources and a plurality of NR-sidelink resources using the DCI format.

In some implementations, the C-V2X carrier is configured by the BS or preconfigured. The BWP indicator is an index-based indicator. A size of the BWP indicator is equal to or less than 3 bits for spectrum bands in a first frequency range and greater than or equal to 5 bits for spectrum bands in a second frequency range. The transmission start timing indicator is an index-based indicator. The DCI format includes a scheduling sidelink grant, when the scheduling sidelink grant is for an LTE-V2X transmission, a transmission start timing is expressed in a number of LTE subframes. When the scheduling sidelink grant is for a NR-V2X transmission, a transmission start timing is expressed in a number of orthogonal frequency division multiplexing (OFDM) symbols of a NR-sidelink carrier. The transmission start timing in the LTE subframes is indicated using 2 bits. The transmission start timing in the OFDM symbols of the NR-sidelink carrier is indicated using 4 bits.

In some implementations, the transceiver 23 is configured to receive, from the BS 10, a downlink control information (DCI) format associated with a cellular vehicle-to-everything (C-V2X) carrier. The C-V2X carrier includes a plurality of bandwidth parts (BWPs), and the DCI format includes a BWP indicator. The processor 21 is configured to perform a long term evolution V2X (LTE-V2X) operation in at least one of the BWPs according to the BWP indicator in the DCI format and perform a new radio V2X (NR-V2X) operation in a remaining of the BWPs according to the BWP indicator in the DCI format.

Further, in some implementations, the processor 21 is configured to treat at least one LTE-sidelink channel for the LTE-V2X operation. The processor 21 is configured to determine a plurality of sidelink resources using the DCI format. The processor is configured to use the transmission start timing indicator to determine a start timing of transmitting a plurality of V2X messages. The processor 21 is configured to determine at least one of a plurality of LTE-sidelink resources and a plurality of NR-sidelink resources using the DCI format.

In the implementation of the present disclosure, the method and the BS 10 for performing resource scheduling and delivering control information in the V2X communication system include allocating the at least one of the BWPs for the LTE-V2X operation according to the BWP indicator in the DCI format and allocating the remaining of the BWPs for the NR-V2X operation according to the BWP indicator in the DCI format. The method and the UE 20 for performing resource scheduling and delivering control information in the V2X communication system include performing the LTE-V2X operation in the at least one of the BWPs according to the BWP indicator in the DCI format and performing the NR-V2X operation in the remaining of the BWPs according to the BWP indicator in the DCI format. Therefore, the implementations provide faster and more flexible method of scheduling sidelink resources for LTE-V2X and NR-V2X communications.

Figure 2:
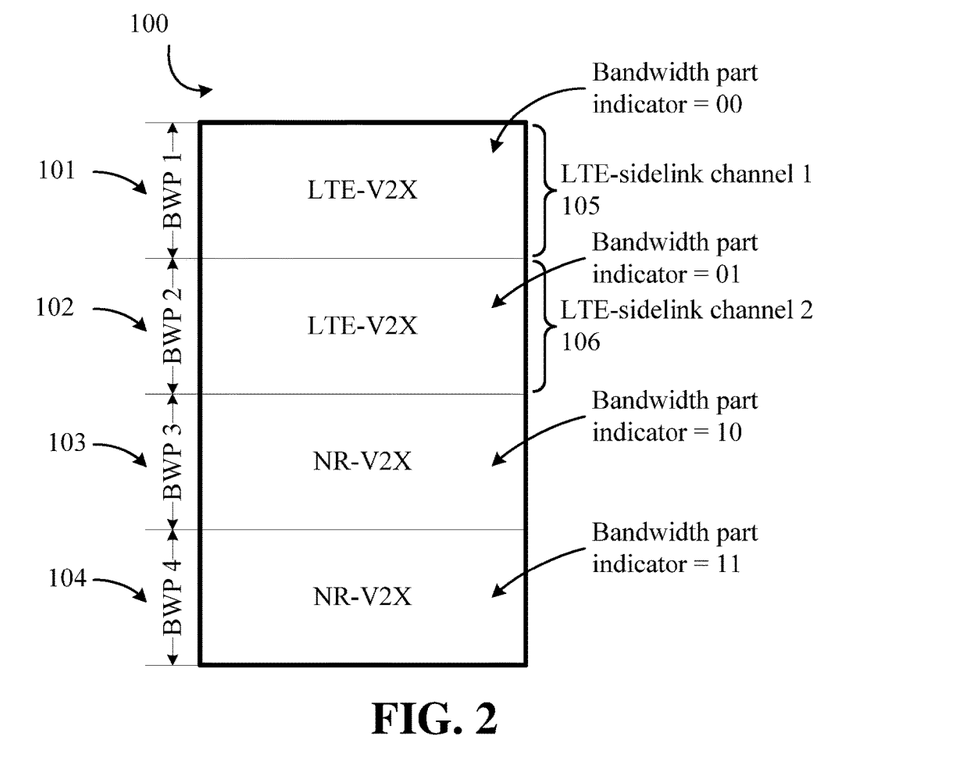
FIG. 2 is a diagram of a structure of a cellular V2X (C-V2X) carrier according to an implementation of the present disclosure.

Refer to FIGS. 1 and 2, in some implementations, for a V2X-UE 20 that is capable of connecting to an NR BS 10 and receiving control signaling over a NR Uu interface, the UE 20 may be configured by the network a C-V2X carrier 100 including multiple bandwidth parts (BWPs) 101, 102, 103, and 104. A spectrum frequency band in which the C-V2X carrier 100 is configured could be allocated for both LTE-V2X and NR-V2X operations, where one or more of the configured BWPs 101 and 102 may directly overlap with already assigned LTE-sidelink channels 105 and 106 for the LTE-V2X operation and the remaining configured BWPs 103 and 104 are allocated for the NR-V2X operation.

In details, an index-based BWP indicator field (as opposed to a bitmap-based representation) may be incorporated in a downlink control information (DCI) format X, which is to be sent over NR downlink and used for scheduling sidelink resources and timing of V2X message transmissions for the V2X UE 20. By using this parameter field, the BS 10 is able to dynamically select which of the configured BWP the UE 20 can transmit V2X messages and indicate this selection to the UE 20. Therefore, instead of reading the carrier index field from a legacy LTE DCI format 5A for scheduling LTE-sidelink resources, NR capable V2X UEs are able to dynamically switch between LTE-V2X and NR-V2X transmissions within a C-V2X carrier.

As exemplary illustrated in FIG. 2, a BWP indicator of value 00 is used for pointing to a first BWP 101 for LTE-V2X, a BWP indicator of value 01 is used for pointing to a second BWP 102 for LTE-V2X, a BWP indicator of value "10" is used for pointing to a third BWP 103 for NR-V2X, and a BWP indicator of value "11" is used for pointing to a fourth BWP 104 for NR-V2X. A length of the BWP indicator parameter field could be up to maximum of 3 bits for spectrum bands in frequency range 1 (FR1) and maximum of 5 bits for spectrum bands in frequency range 2 (FR2).

Figure 3:
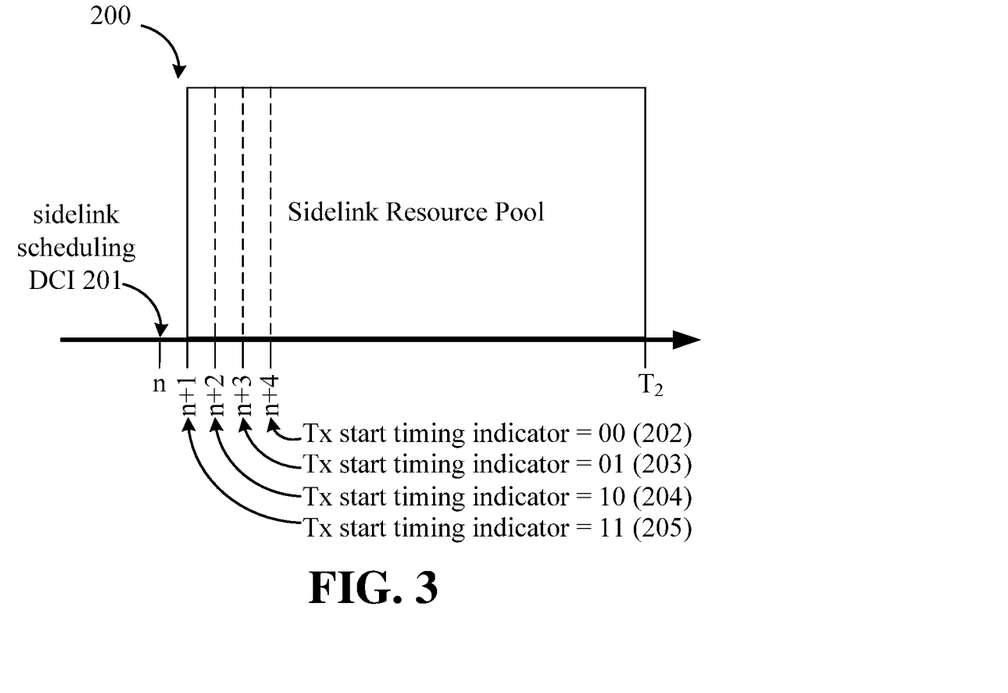
FIG. 3 is a schematic diagram of a transmission start timing indication for long term evolution (LTE) sidelink according to an implementation of the present disclosure.

Refer to FIGS. 1 and 3, in some implementations, an index-based transmission (Tx) start timing indicator (as opposed to a bitmap-based representation) may be incorporated in the DCI format X to cater for possible different processing capabilities of at least one V2X-UE 20. As such, V2X messages for more advanced use cases with stringent latency requirements (e.g. 3 ms, 5 ms, 10 ms) could also be accommodated and transmitted on LTE-sidelink carriers. In LTE-V2X system, in order for the BS 10 to select resources from a sidelink resource pool for the UE 20 to transmit messages, the BS 10 assumes the UE 20 has a processing capability of 4 ms, which is a length of 4 LTE subframes. That is, in reference to FIG. 3, a transmission start timing indication 200 for long term evolution (LTE) sidelink is provided. If the BS 10 provides a sidelink scheduling grant/DCI 201 in subframe n, allocated resources for the UE 20 within the sidelink resource pool can not be earlier than subframe n+4 to give sufficient time for the UE 20 to prepare messages before transmission. For at least one UE 20 that supports NR-V2X, the at least one UE 20 may have different processing capabilities, which are most likely to be higher than legacy LTE-V2X UEs. As such, NR-V2X UEs may require less time to prepare messages for transmission. Therefore, taking advantage of faster processing of NR-V2X capable UEs, a 2-bit Tx start timing indicator is included in the sidelink scheduling DCI for assigning resources on LTE-sidelink channels.

An exemplary illustration of the 2-bit Tx start timing indicator is illustrated in the transmission start timing indication 200, where a Tx start timing indicator 202 of value "00" is used for pointing to subframe n+4, a Tx start timing indicator 203 of value "01" is used for pointing to subframe n+3, a Tx start timing indicator 204 of value "10" is used for pointing to subframe n+2, and a Tx start timing indicator 205 of value "11" is used for pointing to subframe n+1.

In case of assigning resources on NR-sidelink channels, a 4-bit Tx start timing indicator, representing up to 16 values to cover 14 OFDM symbols within a NR slot, is included in the sidelink scheduling DCI. In principal, the Tx start timing offset is therefore based on the minimum scheduling time unit of the V2X carrier, instead of the carrier where the sidelink scheduling grant is received.

Figure 4:
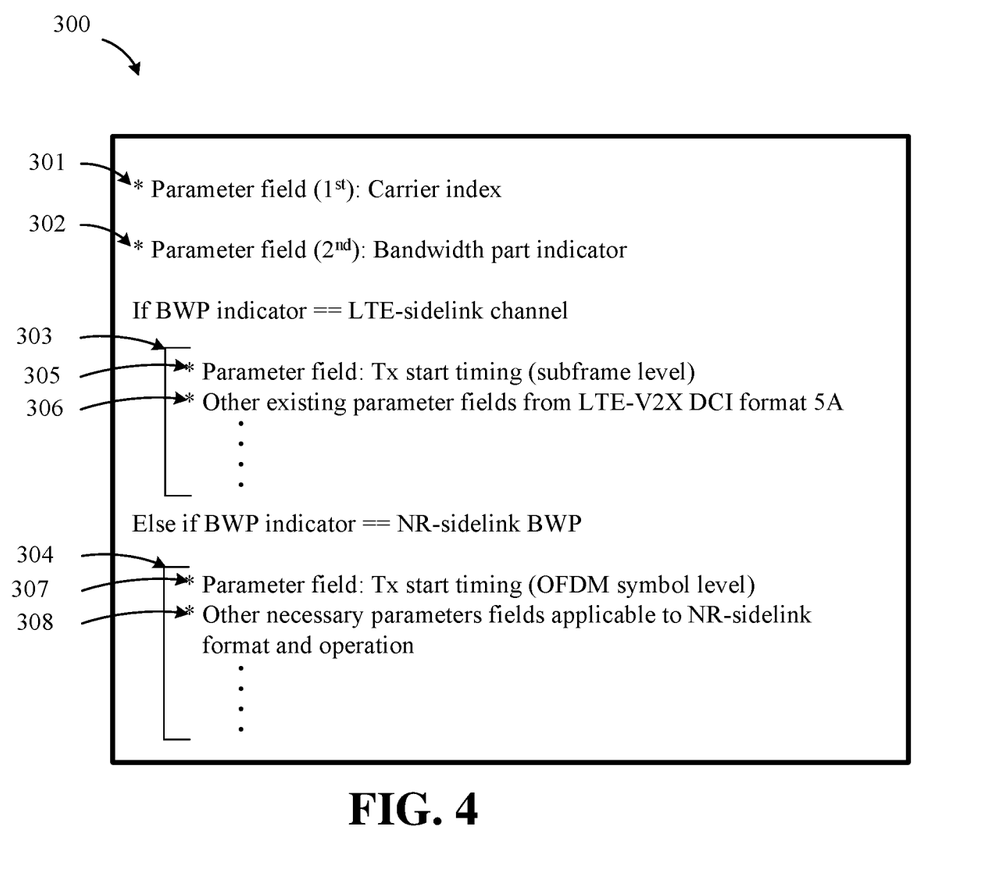
FIG. 4 is a schematic diagram of a downlink control information (DCI) format structure according to an implementation of the present disclosure.

In some implementations, a structure for DCI format X 300 for scheduling either LTE-sidelink or NR-sidelink resources is exemplary illustrated in FIG. 4. In the DCI format X 300, although an order of parameter fields is optional, it may begin with a first parameter field for indicating a carrier index 301. The carrier index is for indicating which of the carriers that have been configured by the network that this sidelink scheduling grant is intended for. In details, if the indicated carrier is a single individual LTE-sidelink carrier/channel, then the set of parameter fields in 303 for scheduling LTE sidelink resources would be provided in the DCI and to be followed by a receiving UE. If the indicated carrier is a NR-sidelink carrier with only one configured BWP, then the set of parameter fields in 304 for scheduling NR sidelink resources would be provided in the DCI and to be followed by the receiving UE.

Further, the second parameter field may indicate a particular bandwidth part within the carrier indicated by the first parameter field 301 that the sidelink scheduling grant is intended for. In details, if the indicated carrier in 301 has only one bandwidth part (e.g. a NR-sidelink carrier) or it has no bandwidth part assigned (e.g. a single individual LTE-sidelink carrier/channel), the BWP indicator parameter field 302 can be ignored by the receiving UE. If the indicated carrier in 301 is configured with more than one bandwidth parts and the indicated BWP in 302 is an LTE-sidelink channel, then the set of parameter fields in 303 for scheduling LTE sidelink resources would be provided in the DCI and to be followed by the receiving UE. Otherwise, the indicated BWP in 302 is for NR-V2X operation, then the set of parameter fields in 304 for scheduling NR sidelink resources would be provided in the DCI and to be followed by the receiving UE.

In some implementations, in the set of parameter fields for scheduling LTE sidelink resources 303, the set of parameter fields includes one or more of the following parameters. A Tx start timing index 305, for indicating an offset in number of subframes from which the UE 20 may start transmitting V2X message. The offset is counted from the subframe UE 20 receives sidelink scheduling DCI. Other existing parameter fields from 3GPP Release 15 DCI format 5A for scheduling LTE sidelink resources 306, such as lowest index of the subchannel allocation to an initial transmission, frequency resource location of initial transmission and retransmission, time gap between initial transmission and retransmission, sidelink index in case of time division duplex (TDD) frame structure is used, sidelink semi-persistent scheduling (SPS) configuration index, and sidelink SPS activation/release indication.

In some implementations, in the set of parameter fields for scheduling NR sidelink resources 304, the set of parameter fields includes one or more of the following parameters. A Tx start timing index 307, for indicating an offset in number of OFDM symbols from which the UE 20 can start transmitting V2X message. The offset is counted from the last OFDM symbol UE 20 receives sidelink scheduling DCI. Any other necessary parameters 308 that are applicable to NR-sidelink format and operation.

Figure 5:
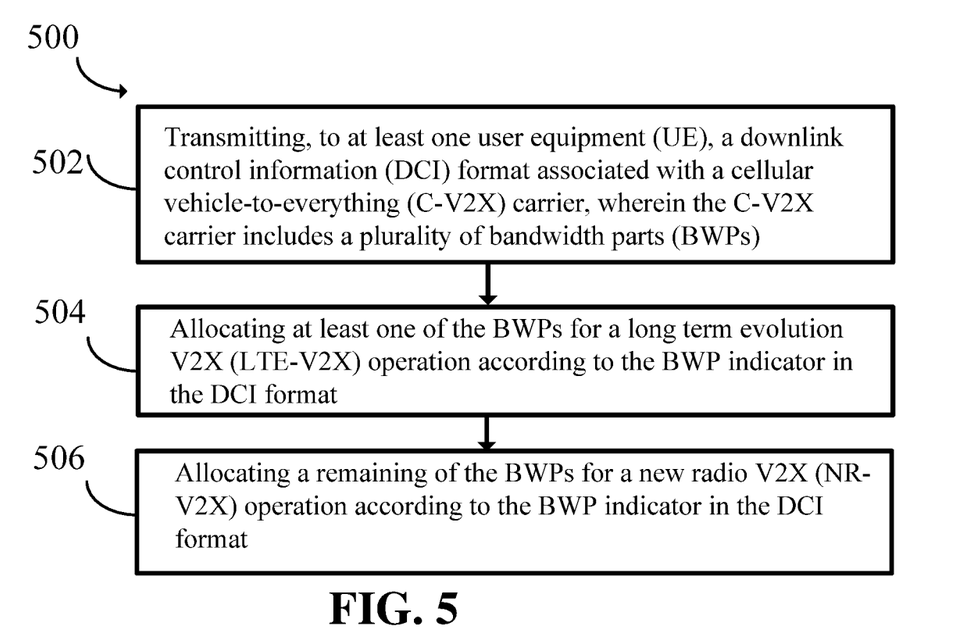
FIG. 5 is a flowchart illustrating a method for performing, a BS, resource scheduling and delivering control information in a V2X communication system according to an implementation of the present disclosure.

FIG. 5 illustrates a method 500 for performing, the BS 10, resource scheduling and delivering control information in a V2X communication system according to an implementation of the present disclosure.

The method 500 includes: at block 502, transmitting, to at least one user equipment (UE) 20, a downlink control information (DCI) format associated with a cellular vehicle-to-everything (C-V2X) carrier, wherein the C-V2X carrier includes a plurality of bandwidth parts (BWPs), at block 504, allocating at least one of the BWPs for a long term evolution V2X (LTE-V2X) operation according to the BWP indicator in the DCI format, and at block 506, allocating a remaining of the BWPs for a new radio V2X (NR-V2X) operation according to the BWP indicator in the DCI format.

In some implementations, the method 500 further includes assigning at least one LTE-sidelink channel for the LTE-V2X operation. The method 500 further includes scheduling a plurality of sidelink resources for the at least one UE using the DCI format. The method 500 further includes incorporating a transmission start timing indicator in the DCI format. The method 500 further includes indicating a start timing for the at least one UE to transmit a plurality of V2X messages using the transmission start timing indicator. The method 500 further includes scheduling at least one of a plurality of LTE-sidelink resources and a plurality of NR-sidelink resources using the DCI format.

Figure 6:
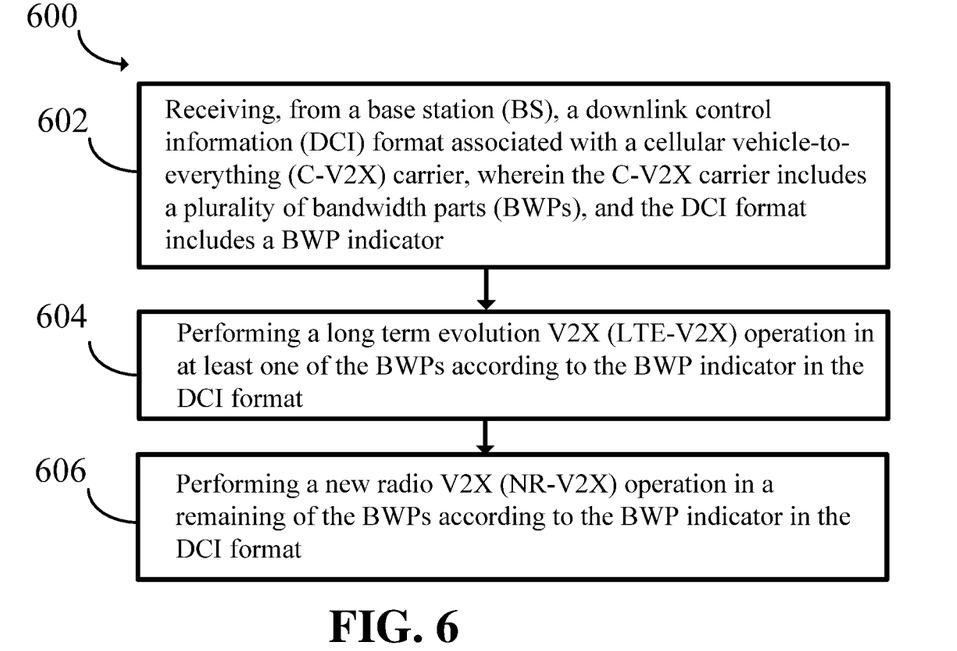
FIG. 6 is a flowchart illustrating a method for performing, a UE, resource determining and interpreting control information in a V2X communication system according to an implementation of the present disclosure.

FIG. 6 illustrates a method 600 for performing, the UE 20, resource determining and interpreting control information in a V2X communication system according to an implementation of the present disclosure.

The method 600 includes: at block 602, receiving, from a base station (BS) 10, a downlink control information (DCI) format associated with a cellular vehicle-to-everything (C-V2X) carrier, wherein the C-V2X carrier includes a plurality of bandwidth parts (BWPs), and the DCI format includes a BWP indicator, at block 604, performing a long term evolution V2X (LTE-V2X) operation in at least one of the BWPs according to the BWP indicator in the DCI format, and at block 606, performing a new radio V2X (NR-V2X) operation in a remaining of the BWPs according to the BWP indicator in the DCI format.

In some implementations, the method 600 further includes treating at least one LTE-sidelink channel for the LTE-V2X operation. The method 600 further includes determining a plurality of sidelink resources using the DCI format. The method 600 further includes using the transmission start timing indicator to determine a start timing of transmitting a plurality of V2X messages. The method 600 further includes determining at least one of a plurality of LTE-sidelink resources and a plurality of NR-sidelink resources using the DCI format.

In the implementations, the at least one UE supports both LTE-V2X and NR-V2X operations. The implementations enhance and streamline C-V2X operations over LTE-sidelink and NR-sidelink interfaces for 5G-NR capable UE. By incorporating resource and transmission control parameters in the sidelink scheduling DCI, the UE is able to perform and support following functionalities over the LTE-sidelink interface. The following functionalities include a dynamic switching between LTE/LTE-sidelink and LTE/NR-sidelink within same C-V2X carrier to provide a faster operation and a reduced UE processing complexity. The following functionalities also include transmission of V2X messages with very stringent latency requirement of 3 ms and 10 ms, such that LTE-sidelink is able to support more advanced V2X use cases and more sidelink resources for the network to select from a single DCI format X that can be used for scheduling either LTE-sidelink or NR-sidelink resources, so as to provide less UE processing complexity and thus saving UE power consumption from monitoring just one DCI format. Further, the implementations also provide faster and more flexible method of scheduling sidelink resources for LTE-V2X and NR-V2X communications through a dynamic indication of BWP in the DCI and/or a dynamic indication of Tx start timing in the DCI. The implementations are also a combination of techniques/processes that can be adopted in 3GPP specification to create an end product.

Figure 7:
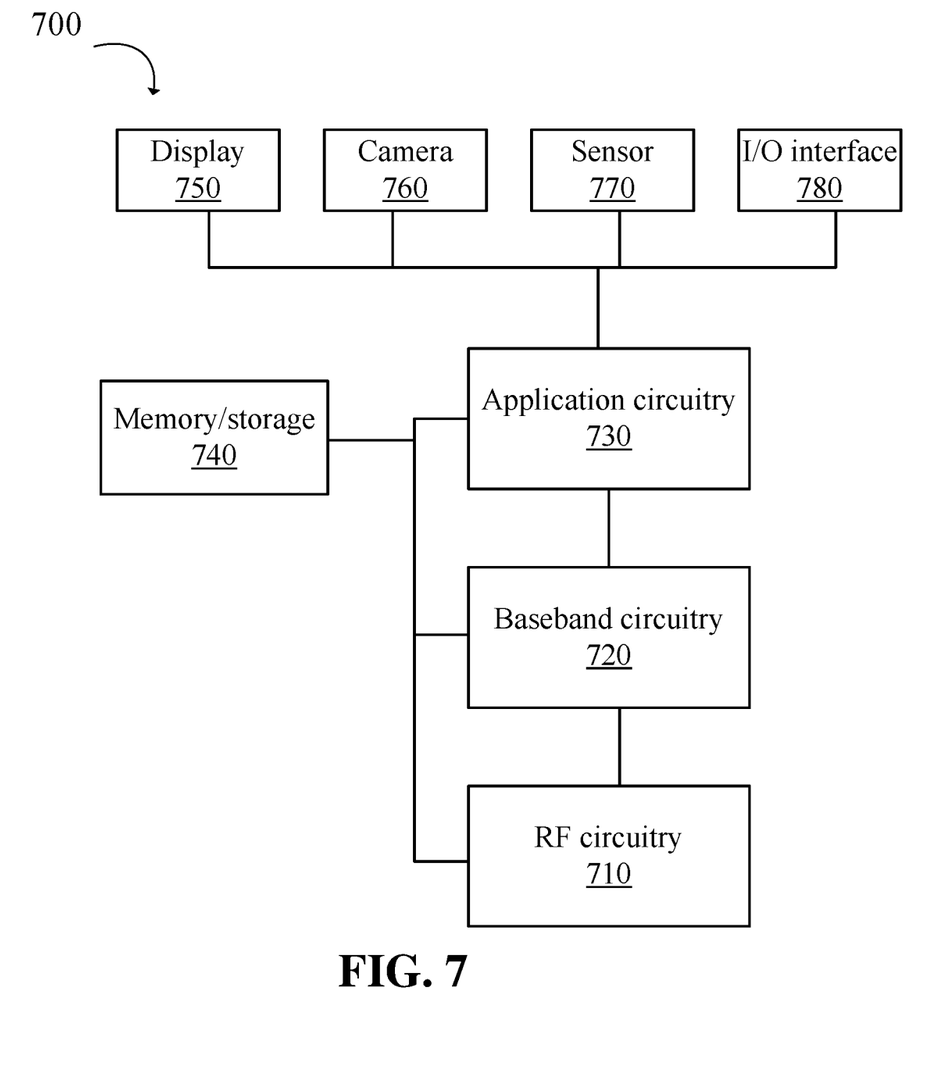
FIG. 7 is a block diagram of a system for wireless communication according to an implementation of the present disclosure.

FIG. 7 is a block diagram of a system 700 for wireless communication according to an implementation of the present disclosure. Implementations described herein may be implemented into the system using any suitably configured hardware and/or software. FIG. 7 illustrates, for one implementation, an example system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EUTRAN) and/or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 720 may include circuitry to operate with signals that are not strictly considered as being in a baseband frequency. For example, in some implementations, baseband circuitry may include circuitry to operate with signals having an intermediate frequency, which is between a baseband frequency and a radio frequency.

RF circuitry 710 may enable communication with wireless networks using modulated electromagnetic radiation through a non-solid medium. In various implementations, the RF circuitry may include switches, filters, amplifiers, etc. to facilitate the communication with the wireless network.

In various implementations, the RF circuitry 710 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the electronic device circuitry may be implemented in, or functions associated with the circuitry may be implemented by, one or more software or firmware modules.

In some implementations, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one implementation may include any combination of suitable volatile memory, such as dynamic random access memory (DRAM)), and/or non-volatile memory, such as flash memory.

In various implementations, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various implementations, the sensor 770 may include one or more sensing devices to determine environmental conditions and/or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various implementations, the display 750 may include a display, such as a liquid crystal display and a touch screen display.

In various implementations, the system 700 may be a mobile computing device such as, but not limited to, a laptop computing device, a tablet computing device, a netbook, an ultrabook, a smartphone, etc. In various implementations, system may have more or less components, and/or different architectures.

Where appropriate, methods described herein may be implemented as a computer program. The computer program may be stored on a storage medium, such as a non-transitory storage medium.

A person having ordinary skill in the art understands that each of the units, algorithm, and steps described and disclosed in the implementations of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and unit in the above-mentioned implementation since the working processes of the above-mentioned system, device, and unit are basically the same. For easy description and simplicity, these working processes will not be detailed.

It is understood that the disclosed system, device, and method in the implementations of the present disclosure can be realized with other ways. The above-mentioned implementations are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the implementations.

Moreover, each of the functional units in each of the implementations can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the implementations of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred implementations, it is understood that the present disclosure is not limited to the disclosed implementations but is intended to cover various arrangements made without departing from the scope of the broadest interpretation of the appended claims.

What is claimed is:

1. A base station (BS), comprising:
   a memory;
   a transceiver configured to transmit, to at least one user equipment (UE), a downlink control information (DCI) format associated with a cellular vehicle-to-everything (C-V2X) carrier, wherein the C-V2X carrier comprises a plurality of bandwidth parts (BWPs); and
   a processor coupled to the memory and the transceiver, wherein the processor is configured to:
      incorporate a BWP indicator in the DCI format;
      allocate at least one of the BWPs for a long term evolution V2X (LTE-V2X) operation according to the BWP indicator in the DCI format; and
      allocate a remaining of the BWPs for a new radio V2X (NR-V2X) operation according to the BWP indicator in the DCI format.

2. The BS of claim 1, wherein the C-V2X carrier is configured by the BS or preconfigured.

3. The BS of claim 1, wherein the BWP indicator is an index-based indicator.

4. The BS of claim 1, wherein the processor is configured to schedule a plurality of sidelink resources for the at least one UE using the DCI format.

5. The BS of claim 1, wherein the processor is configured to schedule at least one of a plurality of LTE-sidelink resources and a plurality of NR-sidelink resources using the DCI format.

6. A method for performing, by a base station (BS), resource scheduling and delivering control information in a vehicle-to-everything (V2X) communication system, the method comprising:
   transmitting, to at least one user equipment (UE), a downlink control information (DCI) format associated with a cellular vehicle-to-everything (C-V2X) carrier, wherein the C-V2X carrier comprises a plurality of bandwidth parts (BWPs);
   incorporating a BWP indicator in the DCI format;
   allocating at least one of the BWPs for a long term evolution V2X (LTE-V2X) operation according to the BWP indicator in the DCI format; and
   allocating a remaining of the BWPs for a new radio V2X (NR-V2X) operation according to the BWP indicator in the DCI format.

7. The method of claim 6, wherein the C-V2X carrier is configured by the BS or preconfigured.

8. The method of claim 6, wherein the BWP indicator is an index-based indicator.

9. The method of claim 6, further comprising scheduling a plurality of sidelink resources for the at least one UE using the DCI format.

10. The method of claim 6, further comprising scheduling at least one of a plurality of LTE-sidelink resources and a plurality of NR-sidelink resources using the DCI format.

11. A user equipment (UE), comprising:
    a memory;
    a transceiver configured to receive, from a base station (BS), a downlink control information (DCI) format associated with a cellular vehicle-to-everything (C-V2X) carrier, wherein the C-V2X carrier comprises a plurality of bandwidth parts (BWPs), and the DCI format comprises a BWP indicator; and
    a processor coupled to the memory and the transceiver, wherein the processor is configured to:
       perform a long term evolution V2X (LTE-V2X) operation in at least one of the BWPs according to the BWP indicator in the DCI format; and
       perform a new radio V2X (NR-V2X) operation in a remaining of the BWPs according to the BWP indicator in the DCI format.

12. The UE of claim 11, wherein the C-V2X carrier is configured by the BS or preconfigured.

13. The UE of claim 11, wherein the BWP indicator is an index-based indicator.

14. The UE of claim 11, wherein the processor is configured to determine a plurality of sidelink resources using the DCI format.

15. The UE of claim 11, wherein the processor is configured to determine at least one of a plurality of LTE-sidelink resources and a plurality of NR-sidelink resources using the DCI format.

16. A method for performing, by a user equipment (UE), resource determining and interpreting control information in a vehicle-to-everything (V2X) communication system, the method comprising:

receiving, from a base station (BS), a downlink control information (DCI) format associated with a cellular vehicle-to-everything (C-V2X) carrier, wherein the C-V2X carrier comprises a plurality of bandwidth parts (BWPs), and the DCI format comprises a BWP indicator;

performing a long term evolution V2X (LTE-V2X) operation in at least one of the BWPs according to the BWP indicator in the DCI format; and performing a new radio V2X (NR-V2X) operation in a remaining of the BWPs according to the BWP indicator in the DCI format.

17. The method of claim 16, wherein the C-V2X carrier is configured by the BS or preconfigured.

18. The method of claim 16, wherein the BWP indicator is an index-based indicator.

19. The method of claim 16, further comprising determining a plurality of sidelink resources using the DCI format.

20. The method of claim 16, further comprising determining at least one of a plurality of LTE-sidelink resources and a plurality of NR-sidelink resources using the DCI format.

* * * * *